G. DANIELS.
Thrashing Machine.
No. 12,378. Patented Feb. 13, 1855.
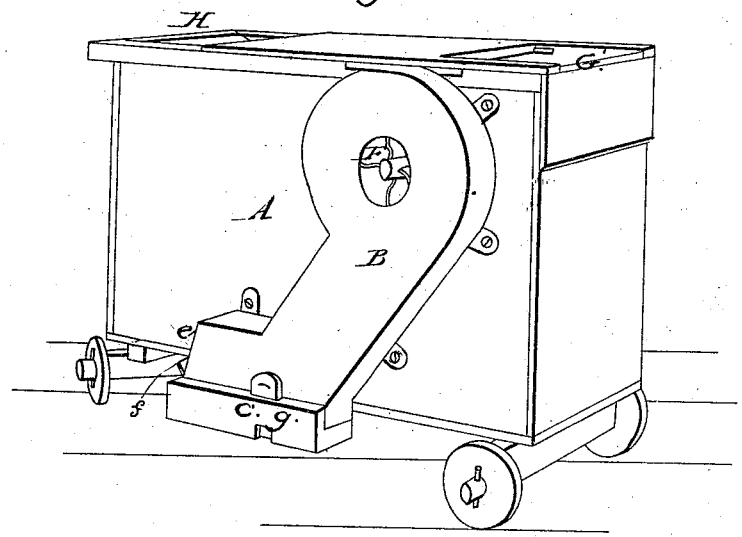
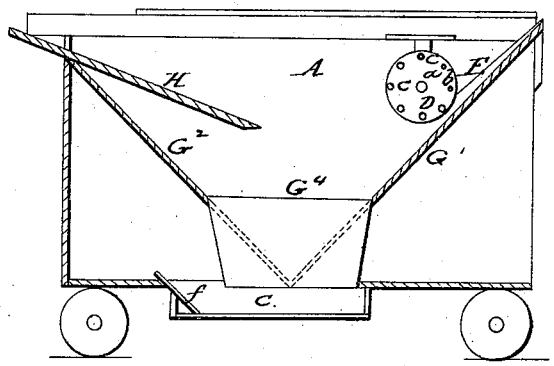
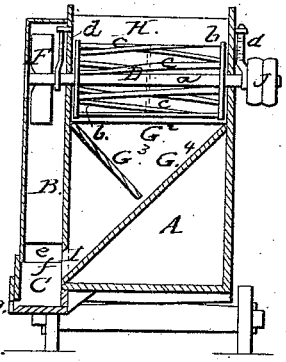
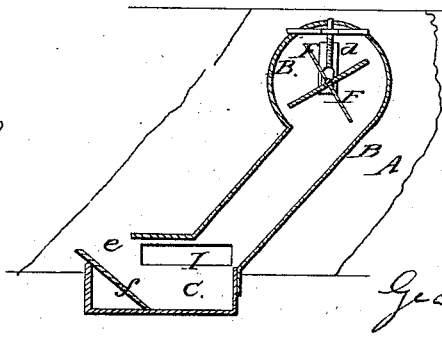
Witnesses:
Inventor:

UNITED STATES PATENT OFFICE.

GEORGE DANIELS, OF PHILADELPHIA, PENNSYLVANIA.

THRESHER AND CLEANER OF GRAIN.

Specification of Letters Patent No. 12,378, dated February 13, 1855.

*To all whom it may concern:*

Be it known that I, GEORGE DANIELS, of the city of Philadelphia and State of Pennsylvania, have invented a new and useful Improvement on the Machine for Threshing and Cleaning Grain; and I do hereby declare that the following is a full, clear, and exact description of the construction and operation of the same, reference being had to the annexed drawings, making a part of this specification, in which—

Figure 1, is a perspective view; Fig. 2, a longitudinal section; Fig. 3, a transverse section; and Fig. 4, a section of the fan and its case.

The nature of my invention consists in the peculiar construction of the threshing cylinder, and in its peculiar combination, with a cast iron threshing bed and the fan or blower; in the peculiar arrangement and construction of the inclined planes for conveying the threshed grain to the receiving box; and in the peculiar combination of the blowing case, and receiving box with inclined plane. These several peculiarities are combined together with a suitable boxed frame, which is placed upon wheels for moving it about in the fields, and is more especially intended and designed for the use and convenience of the grain growers of Oregon, and other extensive grain growing regions where the grain is required to be threshed in the fields, and where complicated and expensive machinery cannot be readily made or repaired.

The same letters indicate like parts in the several figures.

A is a strong boxed-frame of wood, arranged with axles and wheels for moving it about through the fields; B, is the case containing the blower or fan, and is attached to the outside of the boxed frame (A); C is the receiving box for the cleaned grain; D the iron threshing cylinder; E, the iron threshing bed; F is the fan or blower; G the stationary inclined planes for conveying the threshed grain to the receiving box (C); H the adjustable separator for preventing the grain being thrown out with the straw; I, the outlet to the receiving box (C), and J the band pulleys for attaching the driving power.

The threshing cylinder is made of wrought iron, and consists of a main shaft ($a$), two flat circular plates ($b$, $b$,) fast upon the shaft ($a$) and eight (more or less) bars of iron ($c$, $c$, $c$,) of square cross section, which connect the plates ($b$, $b$,) together and form the beaters. These beaters are formed and applied spirally, and their ends firmly riveted in holes made at equal distances apart around near the outer edges of the respective plates ($b$, $b$,) thus forming what may be called a skeleton cylinder. If desirable a middle plate may also be used, for greater strength, and applied as shown by the dotted lines in Fig. 3. The main shaft ($a$) projects through on each side of the boxed frame (A,) and on one end the fan or blower (F,) (made in the usual form) is fixed and adapted to revolve in the case (B), and on the other end the driving pulleys (J) are secured in the usual manner.

The length of the cylinder is adapted to fit the width of the box (A) and revolves upon bearings in the usual manner, having cap pieces fitted with springs ($d$, $d$,) so as to allow the cylinder to use and adjust itself to the feed. The bed plate (E) is made of cast iron, in width equal to the length of the cylinder, and rests upon the inclined plane ($G^1$), being formed so that its upper surface may be at a less angle than the plane ($G^1$) and with its lower end curved and adapted to the curve of the cylinder plates ($b$ $b$) and placed near, though not in contact with the cylinder—there being no teeth, either in the cylinder or bed plate. The inclined planes for conveying the threshed grain to the receiving box (C,) are each placed so as to be at an angle of 45 degrees to the horizontal—the planes ($G^1$ and $G^2$) extending from the ends and $G^3$ and $G^4$, from the sides. The plane $G^4$, extends down to the receiving box (C). The plane $G^3$ extends to within about 3 inches of the plane $G^4$, so as to leave an oblong opening for the passage of the threshed grain and heavy chaff, on the plane $G^4$, to the receiving box (C), and the planes $G^1$ and $G^2$ extend down and fit against or upon the side planes so as to form a free passage for the grain and chaff, only to the receiving box C.

The blower case has an opening for the admission of air to the fan in the usual manner, and extends down and fits tight to the side of the main box (A) and along on the two upper edges of the receiving box (C) so as to have an opening or outlet for the current of air and chaff only at the end ($e$) of the box and case. At this end the receiving box has an inclined plane ($f$)

which gives the current of air and chaff an upward direction.

The mode of operation of my improved thresher and cleaner, is as follows: Power being applied to the pulleys so as to give about 800 revolutions to the cylinder in a minute, the grain to be threshed and cleaned is fed gradually between the bed plate and cylinder, through the opening on the top, in the usual manner—the beaters, and edges on the bed plate together, threshing the grain. The straw is thrown out at the opening in the other end of the machine, over the adjustable plane (H), and the grain and heavy chaff falling on the four inclined planes are conveyed to and run out at the opening (I) when encountering the current of air from the blower, the chaff is separated and blown out at the opening (e) over the inclined plane (f) in the end of the box (C), the cleaned grain falling into the receiving box (C). This box is fitted with an opening (g) and sliding gate, through which opening the cleaned grain is filled into bags and removed. Should any grain be driven out with the straw, the adjustable plane (H) is readily adjusted at such an inclination as may be found sufficient to prevent it.

With this machine I can thresh, clean and bag from 800 to 1,000 bushels of barley or wheat in a day, and more perfectly than can be done with any of the more complicated and expensive machines now in use.

I usually make the main boxed frame about 6 feet high, 5 feet wide, and 11 feet long, in the clear—the cylinder about 5 feet long and 2½ ft. in diameter, with about ten beaters or bars—each, of bar iron 1¼ inches square—or, if round, 1¼ inches diameter—the cylinder plates of boiler iron about ⅜ of an inch thick; the main shaft of wrought iron, round and about 2 in. in diameter; and the bed plate of cast iron, and made with the curved end (or end next to the cylinder) about 3 inches deep and placed with the curved face, within from about a quarter to three quarters of an inch from the beaters of the cylinder.

By constructing a cylinder as above described I am enabled to dispense with the teeth usually required in the peripheries of cylinders having a continuous surface, and to produce one, not liable to bursting or other defects, risking the life of the workman; and this at less cost in the original construction and subsequent repairs—and the fan being placed immediately on the shaft of the cylinder, no bands or gearing usually required to give it motion in the case, are required—and in the arrangement of the inclined planes, and the blower case on the outside, with the receiving box and its inclined plane, as described, a more simple, easily constructed, less costly and more effectual apparatus is afforded for threshing, cleaning and bagging grain in the fields as described.

I do not claim as my invention, a skeleton cylinder—nor inclined plane—nor a blower case containing a fan, attached to threshers and cleaners, irrespective of the peculiar construction of each as herein described, nor do I claim placing a fan upon the shaft of a beating cylinder, as this combination has been known and used before; but

What I claim as my invention, and desire to secure by Letters Patent is,

1. I claim a skeleton cylinder in combination with a cast iron bed plate, constructed and for the purposes as specified.

2. I claim the four inclined planes (G), placed in relation to each other as described, each at an angle of about 45 degrees, as described, and so as to leave an oblong opening between them for the passage of the grain and chaff to the receiving box (C), substantially and for the purposes as described.

3. I claim the blower case (B) the receiving box (C) with its inclined plane (f) at its end, arranged and combined on the outside of the box or body of the machine, substantially and for the purposes as specified.

GEORGE DANIELS.

Witnesses:
   Thos. Hope Palmer,
   Benj. Morison.